United States Patent [19]
Sugimoto et al.

[11] Patent Number: 5,969,771
[45] Date of Patent: Oct. 19, 1999

[54] 2-LINE YC SEPARATION DEVICE

[75] Inventors: Hiroko Sugimoto, Hirakata; Atsuhisa Kageyama, Ibaraki, both of Japan

[73] Assignee: Matsushita Electric Industrial Co., Ltd., Osaka, Japan

[21] Appl. No.: 08/961,611

[22] Filed: Oct. 31, 1997

[30]  Foreign Application Priority Data

Nov. 1, 1996 [JP]  Japan ................................ 8-291413

[51] Int. Cl.⁶ ............................ H04N 9/77; H04N 9/78
[52] U.S. Cl. ...................... 348/663; 348/665; 348/667; 348/668
[58] Field of Search ........................ 348/663, 665, 348/667, 668, 670, 664; 345/84, 7, 8, 9; H04N 9/77, 9/78

[56]  References Cited

U.S. PATENT DOCUMENTS 4,600,937  7/1986  Kudo et al. ........................... 348/663
4,994,906  2/1991  Moriwake ............................. 348/664
5,786,872  7/1998  Miyazaki et al. ..................... 348/670

FOREIGN PATENT DOCUMENTS 1-117494  5/1989  Japan.

*Primary Examiner*—Nathan Flynn
*Assistant Examiner*—Vivek Srivastava
*Attorney, Agent, or Firm*—Ratner & Prestia

[57]  ABSTRACT

A 2-line YC separation device comprising a delay circuit for delaying a composite input video signal for a horizontal scanning period; a first band-pass filter which receives the composite input video signal; a second band-pass filter which receives the output signal of the delay circuit; a Y-correlation detector which receives the output signal of the band-pass filter; a C-correlation detector which receives the output signal of the band-pass filter; a difference detector for detecting a Y signal differential value; a YL-correlation detector for detecting a Y signal correlation; and an AND circuit for logically ANDing the output signals of the YL-correlation detector and the Y-correlation detector.

7 Claims, 12 Drawing Sheets

PRIOR ART

2-LINE YC SEPARATION DEVICE

FIELD OF THE INVENTION

The present invention relates to comb-line filters for 2-line YC separation.

BACKGROUND OF THE INVENTION 2-line luminance-chrominance (YC) separation devices are increasingly drawing attention as inexpensive means for accurately separating luminance (Y) and chrominance (C) signals.

FIG. 11 is a block diagram of a 2-line YC separation device disclosed in Japanese Laid-open Patent Application No. H1-117494.

The 2-line YC separation device in FIG. 11 comprises a one horizontal scanning period delay circuit (1HDL) 2202, a subtractor 2203, another subtractor 2204, a band-pass filter (BPF) 2205, a switch circuit 2206, a chrominance subcarrier frequency trap circuit (T) 2207, a switch circuit 2208, a low-pass filter (LPF) 2211, a YL-correlation detector (YLC) 2212 (where the L component is the low-frequency luminance component), a band-pass filter (BPF) 2213, a chrominance detector (C) 2214, and an AND circuit 2215. The 2-line YC separation device separates a Y signal output 2209 and a chrominance signal output 2210 from a composite video signal 2201. The Y signal is assumed to consist of a Y signal component YH in the chrominance frequency band and a Y signal YL other than YH. The YL-correlation detector detects a line correlation (hereafter referred to as "correlation") between YL in a present line and YL in a signal delayed for one horizontal scanning period.

The operation of a 2-line YC separation circuit configured as above is described below.

First, a signal, after passing through the one horizontal scanning period delay circuit 2202, is subtracted from the current composite video signal. Then, this signal is made into a YL correlation output signal through the low pass filter circuit 2211. A detection output signal detected by the chrominance detector 2214 after filtering signals in the frequency band of the chrominance signal with the band-pass filter 2213. Both signals pass through the AND circuit 2215 and the output of AND circuit 2215 controls a comb-line filter.

More specifically, the switch circuit 2208 is turned on and, at the same time, the switch circuit 2206 is switched to the current video signal 2201 side only when the YL-correlation detector 2212 determines that i) there is no correlation, and ii) the chrominance detector 2214 detects a chrominance signal or the Y signal in the frequency band of the chrominance signal (YH). In other cases, for example, if the YL correlation detector 2212 determines that there is a correlation, or if the YL correlation detector 2212 determines that there is no correlation, but the chrominance detector 2214 detects no chrominance signal, the switch circuit 2208 is turned off and the switch circuit 2206 is switched to the band-pass filter 2205.

With the YC separation device as configured above, however, YC in an input signal pattern as illustrated in FIGS. 12A to 12J cannot be accurately separated. FIG. 12A is the case when a Y signal, in a vertical direction on a screen, whose frequency is equivalent to that of the chrominance subcarrier frequency, exists up to the 3H line and disappears thereafter.

Here, FIG. 12A is the composite video signal 2201; FIG. 12B is the output signal of the one horizontal scanning period delay circuit 2202; FIG. 12C is the output signal of the subtractor 2203; FIG. 12D is the output signal of the low-pass filter circuit 2211; FIG. 12E is the output of the YL-correlation detector 2212; FIG. 12F is the output of the chrominance detector 2214; FIG. 12G is the chrominance signal output from the chrominance output terminal 2210; and FIG. 12H is the Y signal output 2209 from the Y signal output terminal. Since the output signal of the band-pass filter 2205 is the result of filtering the frequency component of the chrominance subcarrier in the output signal of the subtractor 2203, the output signal of the subtractor 2203 and the band-pass filter 2205 become identical when a video signal such as the signal of FIG. 12A is input. The signal of FIG. 12E has the value "0" when there is a YL correlation, and "1" when there is no YL correlation. The signal of FIG. 12F has the value "1" when a chrorninance signal exists and "0" when there is no chrominance signal. FIG. 12I shows the desirable chrominance signal to be output, and FIG. 12J shows the desirable Y signal to be output.

Looking at FIGS. 12E and 12F, there is no case when i) the YL-correlation detector 2212 does not detect a correlation, and ii) the chrominance detector 2214 detects the presence of the chrominance signal in lines of 1H, 2H, 3H, 4H, and 5H. Consequently, the switch circuit 2208 is turned off and the switch circuit 2206 is switched to the band-pass filter 2205. In this case, the Y signal output becomes the same as the result of subtracting the output signal of the band-pass filter 2205, which is equal to the output signal of the subtractor 2203 in FIG. 12C, from the current composite video signal in FIG. 12A. Therefore, a signal in FIG. 12H is output. The chrominance signal output is the output signal of the band-pass filter 2205 which is equal to the output signal of the subtractor 2203 in FIG. 12C, and therefore a signal in FIG. 12G is output.

This means that in a video image as illustrated in FIG. 12A in which the Y signal in a vertical direction on a screen (having a frequency equivalent to that of a chrominance subcarrier) exists up to the 3H line, and disappears thereafter, the Y signal displayed is as shown in FIG. 12H, and the chrorninance signal displayed is as shown in FIG. 12G. However, a desirable chrominance signal to be output is as shown in FIG. 12I and a desirable Y signal is as shown in FIG. 12J when the signal pattern shown in FIG. 12A is input.

As described above, conventional technology is incapable of separating YC signals correctly, and may result in erroneous display operation, such as degraded horizontal resolution, appearance of color where there should be no color, and appearance of the Y signal where the chrominance signal should be.

SUMMARY OF THE INVENTION

A 2-line YC separation device of the present invention for use with a composite input video signal comprises a first delay circuit for delaying the composite input video signal; a first band-pass filter for filtering said composite input video signal; a second-band pass filter for filtering an output signal of said first delay circuit; a first correlation detector for detecting a first line correlation between two luminance signals of said composite input video signal delayed from each other; a second correlation detector for detecting a second line correlation between two chrominance signals of said composite input video signal delayed from each other; a first inverter for inverting an output signal of said first band-pass filter; a second inverter for inverting an output signal of said second band-pass filter; a calculator for generating a mean value of the output signals of said first and second band-pass filters; a selector which selects and outputs one of i) an output signal of said calculator, ii) an output signal of said first inverter; iii) an output signal of said second inverter, and iv) the output signal of said second band-pass filter, responsive to i) an output signal of said first correlation detector, ii) a delayed output signal of said first correlation detector, iii) an output signal of said second correlation detector, and iv) delayed output signal of said second correlation detector; a subtractor for subtracting the output signal of said first delay circuit and an output signal of said logic circuit; and a filter for filtering the output signal of said logic circuit.

The present invention reduces erroneous operation in comb-filters compared to the prior art, and provides an inexpensive 2-line YC separation device by reducing the number horizontal scanning period delay circuits.

BRIEF DESCRIPTION OF THE DRAWINGS

FIGS. 2A and 2B are logic tables of the exemplary 2-line YC separation device.

DESCRIPTION OF THE PREFERRED EMBODIMENTS

First Exemplary Embodiment

Figure 1:
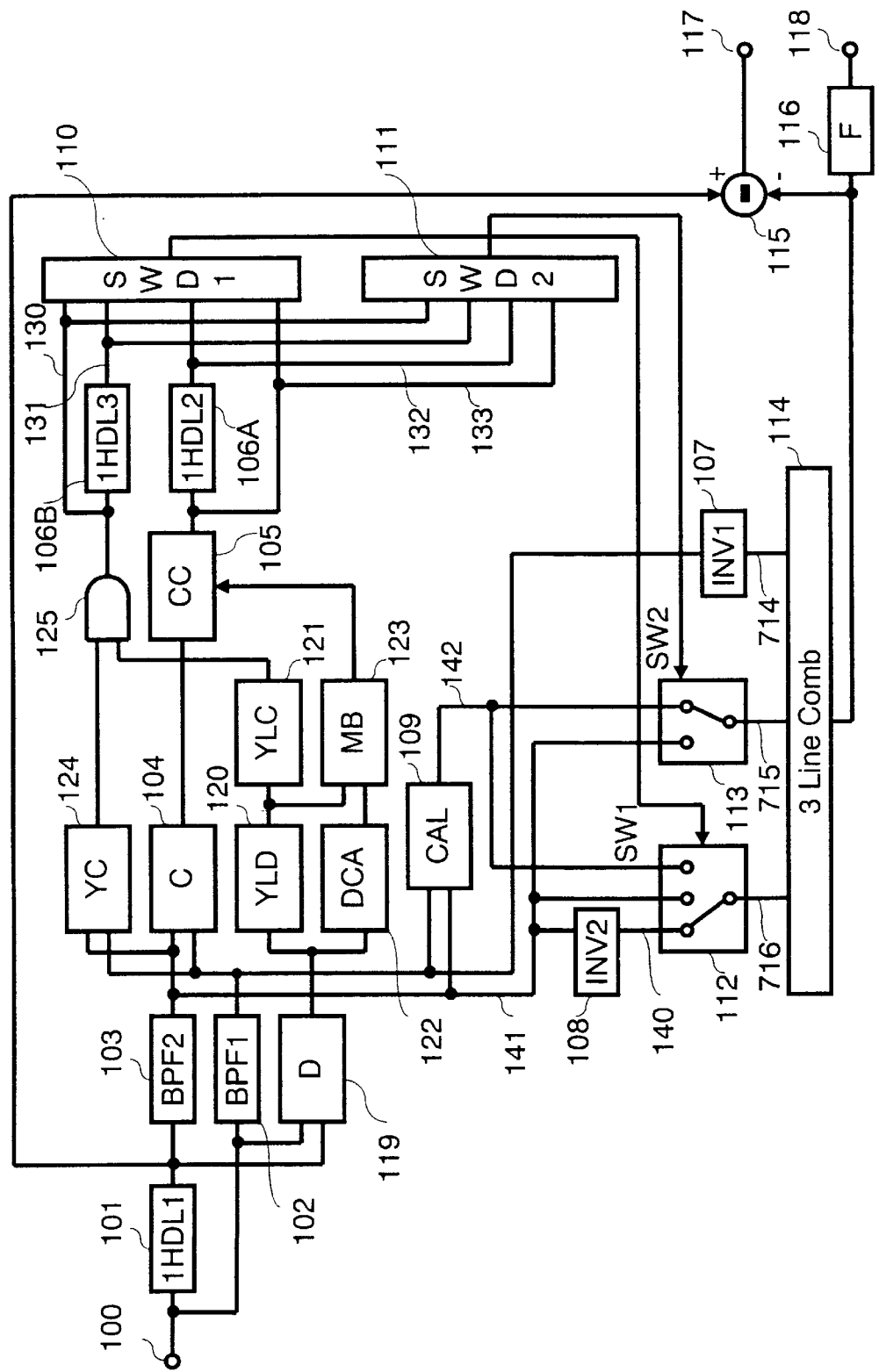
FIG. 1 is a block diagram of a 2-line YC separation device in accordance with a first exemplary embodiment of the present invention.

A first exemplary embodiment of the present invention is explained with reference to FIG. 1.

A first delay circuit (1HDL1) 101 receives a composite video signal 100 and delays it for one horizontal scanning period. A first band-pass filter (BPF1) 102 receives the composite video signal 100, and passes through signals only in the frequency band of the chrorninance signal. A second band-pass filter (BPF2) 103 receives the output signal of the first delay circuit 101, and passes through signals only in the frequency band of the chrominance signal. A C signal detector (C) 104 receives the output signal of the first band-pass filter 102 and the output signal 141 of the second band-pass filter 103, and detects a chrorrunance signal voltage. A C-correlation detector (CC) 105 receives the output signal of the C signal detector 104. A second delay circuit (1HDL2) 106A receives the output signal of the C-correlation detector 105, and delays it for one horizontal scanning period. A third delay circuit (1HDL3) 106B receives the output signal of an AND circuit 125, and delays it for one horizontal scanning period. A first inverter (INV1) 107 inverts the output signal of the first band-pass filter 102, and a second inverter (INV2) 108 inverts the output signal of the second band-pass filter 103. A calculator (CAL) 109 receives the output signals of the first band-pass filter 102 and the second band-pass filter 103, and outputs a mean value of these signals. A first switch determining circuit (SWD1) 110 receives the output signals 130, 131, 132 and 133 of the AND circuit 125, the third delay circuit 106B, the second delay circuit 106A, and the C-correlation detector 105, respectively, and produces a control signal for switching a first switch circuit (SW1) 112. A second switch determining circuit (SWD2) 111 receives the output signals of the AND circuit 125, the third delay circuit 106B, the second delay circuit 106A, and the C-correlation detector 105, and produces a control signal for switching a second switch circuit (SW2) 113. The first switch circuit 112 receives the output signal of the second inverter 108, second band-pass filter 103, and calculator 109, and switches the flow of signals responsive to the output of the first switch determining circuit 110. A second switch circuit 113 receives the output signals of the second band-pass filter 103 and the calculator 109, and switches the flow of signals responsive to the output of the second switch determining circuit 111. A 3-line-comb operational circuit (3 Line Comb) 114 receives the output signals 716, 715, and 714 of the first switch circuit 112, the second switch circuit 113, and the inverter 107, respectively, and performs an arithmetic operation. A subtractor 115 subtracts the output signal of the 3-line-comb operational circuit 114 from the output signal of the first delay circuit 101, and outputs a Y output signal 117. A filter circuit (F) 116 receives the output signal of the 3-line-comb operational circuit 114, filters it, and outputs a chrominance signal 118. A difference detector (D) 119 receives the composite video signal 100 and the output signal of the first delay circuit 101, and detects and outputs a differential voltage from the difference of these two signals. A YL difference detector (YLD) 120 detects an amplitude of the output signal of the difference detector 119 after removing its signal components having a frequency within the frequency band of the chrominance signal. A YL-correlation detector (YLC) 121 receives the output signal of the YL difference detector 120, and determines the presence of a line correlation between the input signal and signal delayed for one horizontal scanning period (hereafter referred to as correlation). A difference adaptive circuit (DA) 122 receives the output signal of the difference detector 119, and determines the presence of a correlation depending on the input signal. The multiburst signal is assumed to be a successively transferred signal of a constant amplitude which is composed of a plurality of frequencies containing a chrominance subcarrier frequency in one line. A multiburst detector (MB) 123 receives the output signals of the YL difference detector 120 and the difference adaptive circuit 122. If the output of the difference adaptive circuit 122 indicates a line correlation, the multiburst detector 123 is turned on and passes through the output signal of the YL difference detector 120 to the C-correlation detector 105. If the output of the difference adaptive circuit 122 is no line correlation, the multiburst detector 123 turns off and does not pass through the output signal of the YL difference detector 120. A YH-correlation detector (YHC) 124 receives the output signals of the first band-pass filter 102 and the second band-pass filter 103. The AND circuit 125 receives the output signals of the YL-correlation detector 121 and the YH-correlation detector 124, and conducts the logical AND operation on these signals.

The operation of a 2-line YC separation device configured as above is outlined next.

The first band-pass filter 102 and the second band-pass filter 103 are filters which pass signals in the frequency band of the chrominance signal. The C signal detector 104 detects a chrominance signal voltage from the output signals of the first band-pass filter 102 and the second band-pass filter 103. The C-correlation detector 105 refers to the results of the level of the chrominance signal detected by the C signal detector 104 and the output of the multiburst detector 123, and sets the logic output value to "1" if the logic output value exceeds a specified value based on the chrominance signal voltage detected by the C signal detector 104, and to "0" if the logic output value is below the specified value.

For the Y component, the difference detector 119 subtracts the output signal of the first delay circuit 101 from the composite video signal 100 to detect a Y input signal difference value. The difference adaptive circuit 122 receives the output signal from the difference detector 119, and detects a correlation (line correlation) between both signals before the signal passes through the first band-pass filter 102 and the second band-pass filter 103. When the difference adaptive circuit 122 determines that there is a line correlation, the multiburst detector 123 is activated to control the threshold of the C-correlation detector 105 in order to heighten the correlation of the chrominance signal by adding the output signal of the YL difference detector 120 to the C-correlation detector 105.

The YH-correlation detector 124 is a circuit which detects a line correlation of a YH signal in the output signals from the first band-pass filter 102 and the second band-pass filter 103. When the YH-correlation detector 124 determines that there is a line correlation, the YH-correlation detector 124 outputs the value "1", and in other cases, YH-correlation detector 124 determines that there is no correlation. The YL-correlation detector 121 outputs the value "1" if there is line correlation responsive to the output of the YL difference detector 120, and outputs the value "0" in other cases.

The Y correlation is determined by conducting the logical AND operation on the output signals of the YL-correlation detector 121 and the YH-correlation detector 124 in the AND circuit 125. The first switch determining circuit and the second switch determining circuit 111 receive the output signals of the C-correlation detector 105, AND circuit 125, second delay circuit 106A, and third delay circuit 106B, and produce a switching control signal in accordance with the logic as shown in FIGS. 2A and 2B for switching the output signal of the first switch circuit 112 and the second switch circuit 113.

Figures 2A, 2B:
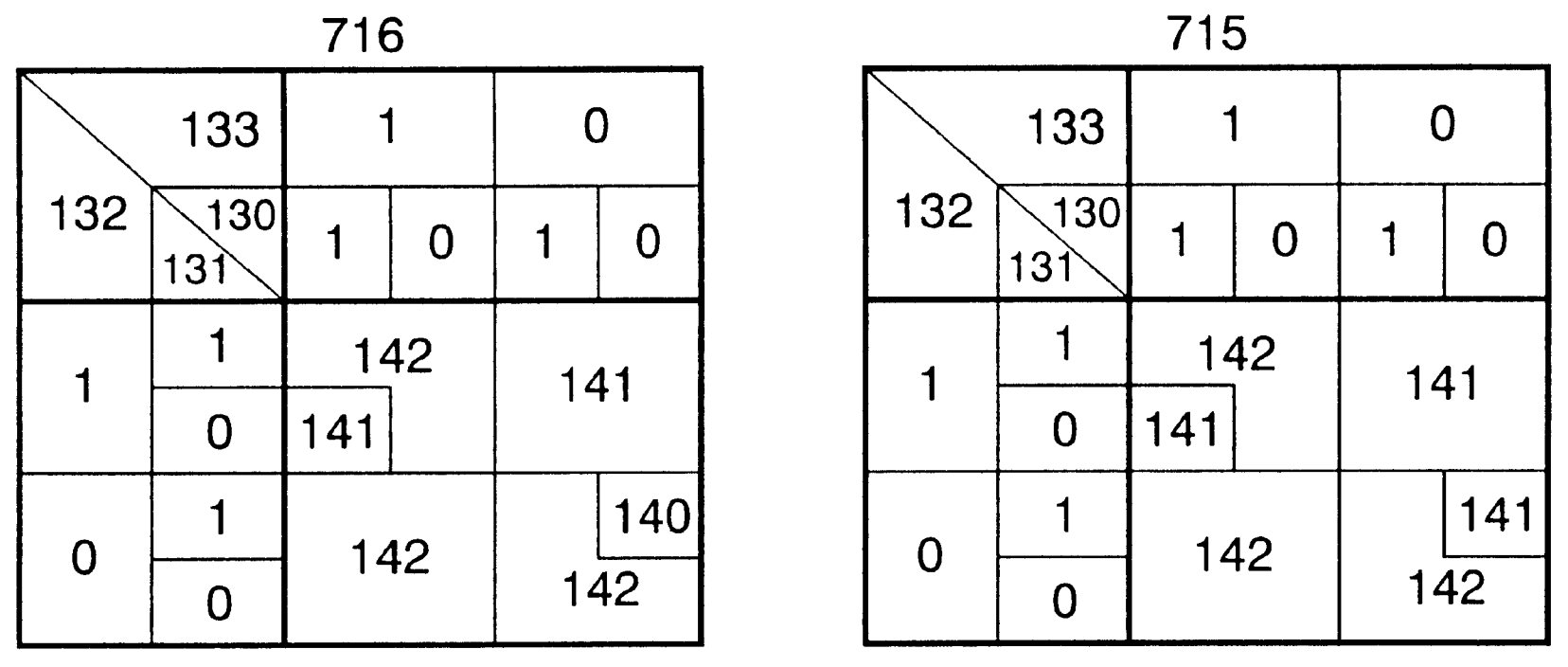

FIG. 2A shows the logic table for an output signal 716 of the switch circuit 112, and FIG. 2B shows a logic table for an output signal 715 of the second switch circuit 113. FIG. 2A shows that the output signal 716 of the first switch circuit 112 is determiined by an output signal 130 of the AND circuit 125, a signal 131 delayed for one horizontal scanning period by the third delay circuit 106B, a signal 132 delayed for one horizontal scanning period by the second delay circuit 106A, and an output signal 133 of the C-correlation detector 105. Each value is set to 1 when there is a correlation, and 0 when there is no correlation. The output signal 716 of the first switch circuit 112 is switched to one of input signals 140, 141, and 142 based on the combination of the signals 130, 131, 132, and 133. In the same way, FIG. 2B shows a logic table for an output signal 715 of the second switch circuit 113, and the output signal 715 is switched to one of input signals 141 and 142 based on the combination of the signals 130, 131, 132, and 133.

Figure 3:
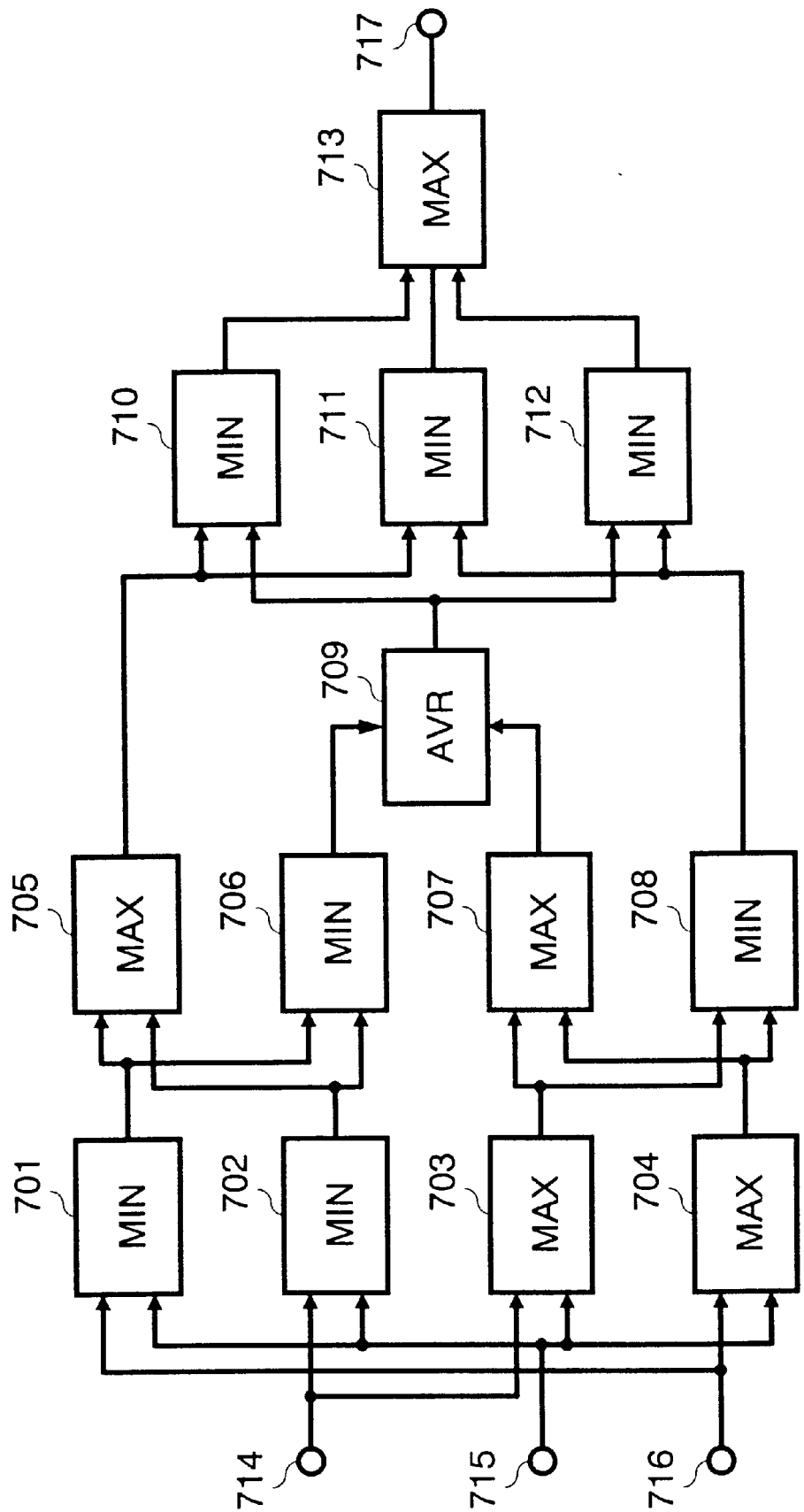
FIG. 3 is a block diagram of a 3-line-comb operational circuit.

FIG. 3 shows the 3-line-comb operational circuit 114. It is a filter originally developed for 3-line-comb operational circuits. In the present invention, the output signal 716 of the first switch circuit 112, the output signal 715 of the second switch circuit 113, and the output signal 714 of the first inverter 107 are input to the 3-line comb operational circuit 114.

The subtractor 115 subtracts the output signal of the 3-line-comb operational circuit 114 from the output signal of the first delay circuit 101, and produces the Y signal output 117. The filter circuit 116 filters the output signal of the 3-line-comb operational circuit 114, and produces the chrominance signal output 118. It is possible that the subtractor 115 subtracts the chrominance signal output 118 from the output signal of the first delay circuit 101 and output Y signal output 117 instead of subtracting the output signal of the 3-line-comb operational circuit 114 from the output signal of the first delay circuit 101. This method can be applied not only to the first exemplary embodiment but also to the second to the sixth exemplary embodiments described below.

Figure 4A:
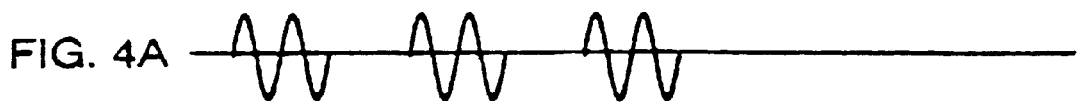
FIGS. 4A to 4P are operation waveforrns of a 2-line YC separation device in accordance with the first exemplary embodiment of the present invention.
Figure 4B:
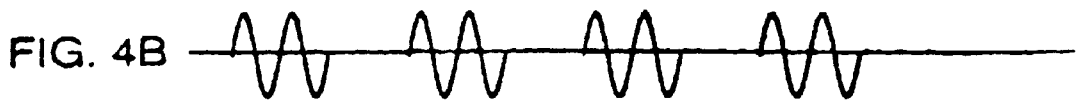
Figure 4C:
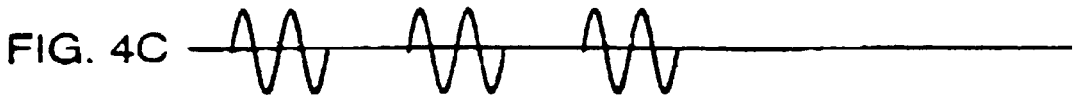
Figure 4D:
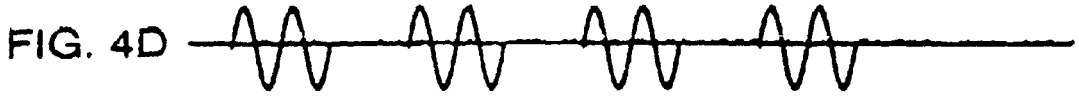
Figure 4E:
Figure 4F:
Figure 4G:
Figure 4H:
Figure 4I:
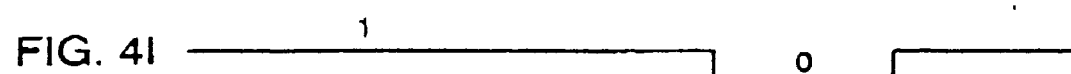
Figure 4J:
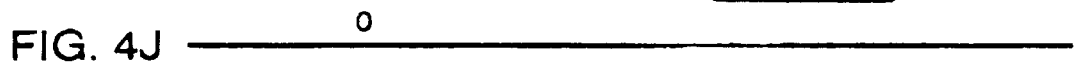
Figure 4K:
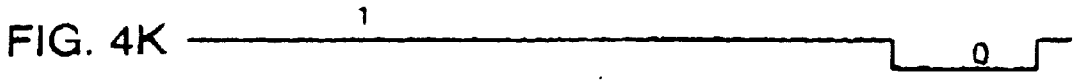
Figure 4L:
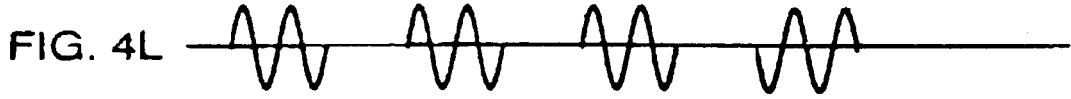
Figure 4M:
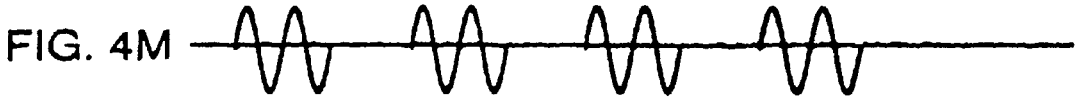
Figure 4N:
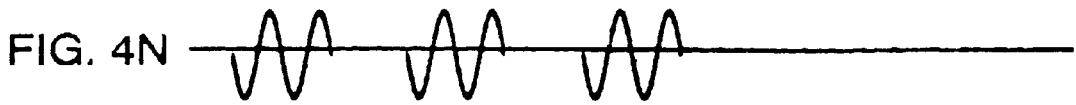
Figure 4O:
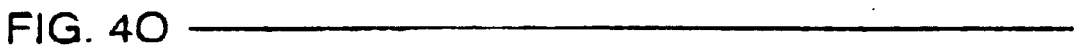
Figure 4P:
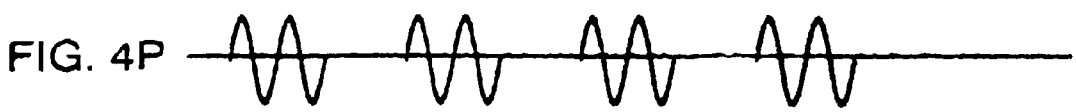

FIGS. 4A to 4P show signal waveforms at each part. FIG. 4A shows the current signal, and FIG. 4B shows a signal after delaying the signal in FIG. 4A for one horizontal scanning period. FIGS. 4C and 4D show signals after filtering through signals in the frequency band of the chrominance signal from the signal in FIG. 4B and FIG. 4A. FIG. 4E shows the output of the YL-correlation detector 121. Looking at the Y signal YL in FIGS. 4A and 4B, the value "1" is output when there is a line correlation in the YL correlation detector 121 and the value "0" is output when there is no correlation. Once again, referring to FIGS. 4A and 4B, the value "1" is output when there is a correlation in the difference adaptive circuit 122, and the value "0" is output when there is no correlation. FIG. 4F shows the output of the difference adaptive circuit 122. FIG. 4G shows the output of the Y-correlation detector 124. Next, referring to FIGS. 4C and 4D, the value "1" is output when there is a correlation in the Y-correlation detector 124, and the value "0" is output when there is no correlation. FIG. 4H shows the output signal 133 of the C-correlation detector 105. Again, referring to FIGS. 4C and 4D, the multiburst detector 123 passes the output of YL difference detector 120 through the multiburst detector 123 and adds it to the C-correlation unit 105 when the output of the multiburst detector 123 is "1" because the output of the difference adaptive circuit 122 is "1". By this operation the multiburst detector 123 controls the threshold of the C-correlation detector 105 in order to heighten the line correlation of the chrominance signal. The C-correlation detector 105 outputs the value "1" when there is line correlation and outputs the value "0" when there is no correlation. FIG. 4I shows the AND circuit 125 output of the YH-correlation detector 124 as shown in FIG. 4G and the output of the YL-correlation detector 121 as shown in FIG. 4E. FIG. 4J shows a signal formed by delaying the signal shown in FIG. 4H for one horizontal scanning period. FIG. 4K shows a signal formed by delaying the signal shown in FIG. 4I for one horizontal scanning period. Signals 133, 130, 132, and 131 shown in FIGS. 4H, 4I, 4J, and 4K are input to the first switch determining circuit 110 and the second switch determining circuit 111. The output signals 716 and 715 shown in FIGS. 4L and 4M, respectively, of the first switch circuit 112 and the second switch circuit 113 are produced in accordance with the logic tables in FIGS. 2A and 2B. FIG. 4N shows an inverted signal of the signal shown in FIG. 4C. The signals 716, 715, and 714 shown in FIGS. 4L, 4M, and 4N are input to respective terminals of the 3-line-comb operational circuit shown in FIG. 3, and its output signal passes through filter circuit 116 to produce the chrominance signal 118 shown in FIG. 4O. The Y output signal 117 as shown in FIG. 4P is produced by subtracting the output signal of the 3-line-comb operational circuit 114 from the signal shown in FIG. 4B.

It is apparent that the waveform shown in FIGS. 4O and 4P are the signals originally desired. The present invention is therefore capable of separating the YC patterns which were previously not separable using the YC separation devices of the prior art.

Second Exemplary Embodiment

Figure 5:
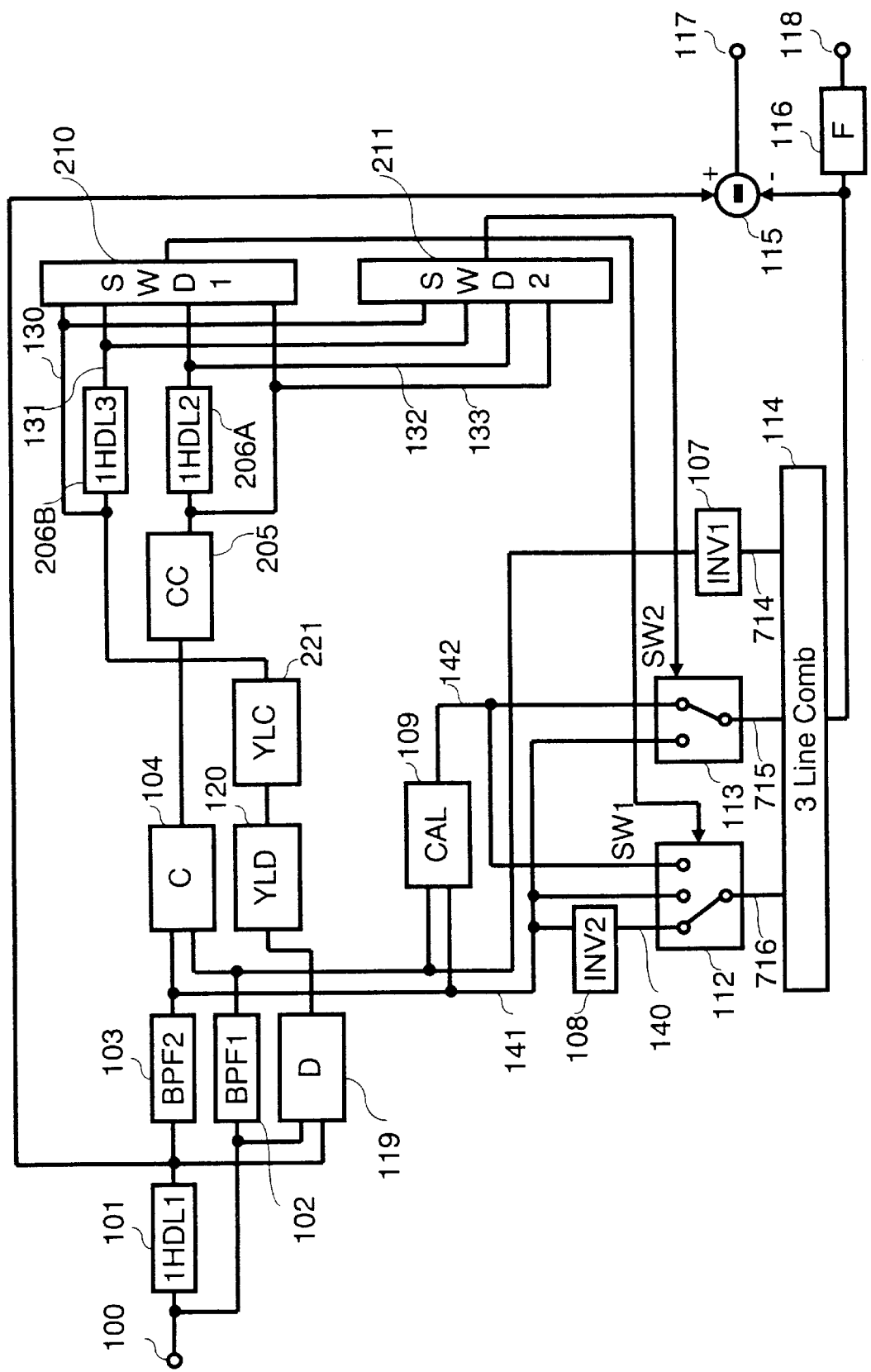
FIG. 5 is a block diagram of a 2-line YC separation device in accordance with a second exemplary embodiment of the present invention.

A second exemplary embodiment of the present invention is explained with reference to FIG. 5. Blocks which are the same as the first exemplary embodiment shown in FIG. 1 are given the same numerals, and thus their explanation is not repeated.

A C-correlation detector (CC) 205 receives the output signal of the C signal detector 104, and outputs the signal to a second delay circuit 206A. A third delay circuit 206B receives the output signals of a YL-correlation detector 221, and delays it for one horizontal scanning period. A switch determining circuit 210 receives the output signals of the YL-correlation detector 221, third delay circuit 206B, second delay circuit 206A, and C-correlation detector 205, and produces a control signal for switching the first switch circuit 112. A switch determining circuit is 211 receives the output signals of the YL-correlation detector 221, third delay circuit 206B, second delay circuit 206A, and C-correlation detector 205, and produces a control signal for switching the second switch circuit 113. The YL-correlation detector 221 determines the presence of line correlation responsive to the output signal of the YL difference detector 120. The remaining configuration is the same as the first exemplary embodiment.

The operation of a 2-line YC separation device configured as above is outlined next. The first band-pass filter 102 and the second band-pass filter 103 are filters which pass signals in the frequency band of the chrominance signal. The C signal detector 104 detects a chrominance signal voltage from the output signals of the first band-pass filter 102 and the second band-pass filter 103. The C-correlation detector 205 outputs the value "1" if there is line correlation and outputs the value "0" in other cases based on the chrominance signal voltage detected by the C signal detector 104.

For the Y signal component, the difference detector 119 subtracts the output signal of the first delay circuit 101 from the composite video signal 100, and the YL difference detector 120 detects a Y signal difference value. The YL-correlation detector 221 outputs the value "1" depending on the output of the YL difference detector 120. In other words, the YL-correlation detector 221 outputs the value "1" if a line correlation is detected based on the Y signal difference value, and outputs the value "0" in other cases. The Y correlation is determined by the output signal of this YL-correlation detector 221.

The switch determining circuits 210 and 211 receive output signals of the C-correlation detector 205, YL-correlation detector 221, second delay circuit 206A, and third delay circuit 206B, and produce a switching control signal in accordance with the logic as shown in FIGS. 2A and 2B to switch the output signal of the first switch circuit 112 and the second switch circuit 113, respectively.

Accordingly, the second exemplary embodiment produces waveforms shown in FIGS. 4A to 4P, as in the first exemplary embodiment, and therefore is capable of separating the YC signals as in the first exemplary embodiment.

Third Exemplary Embodiment

Figure 6:
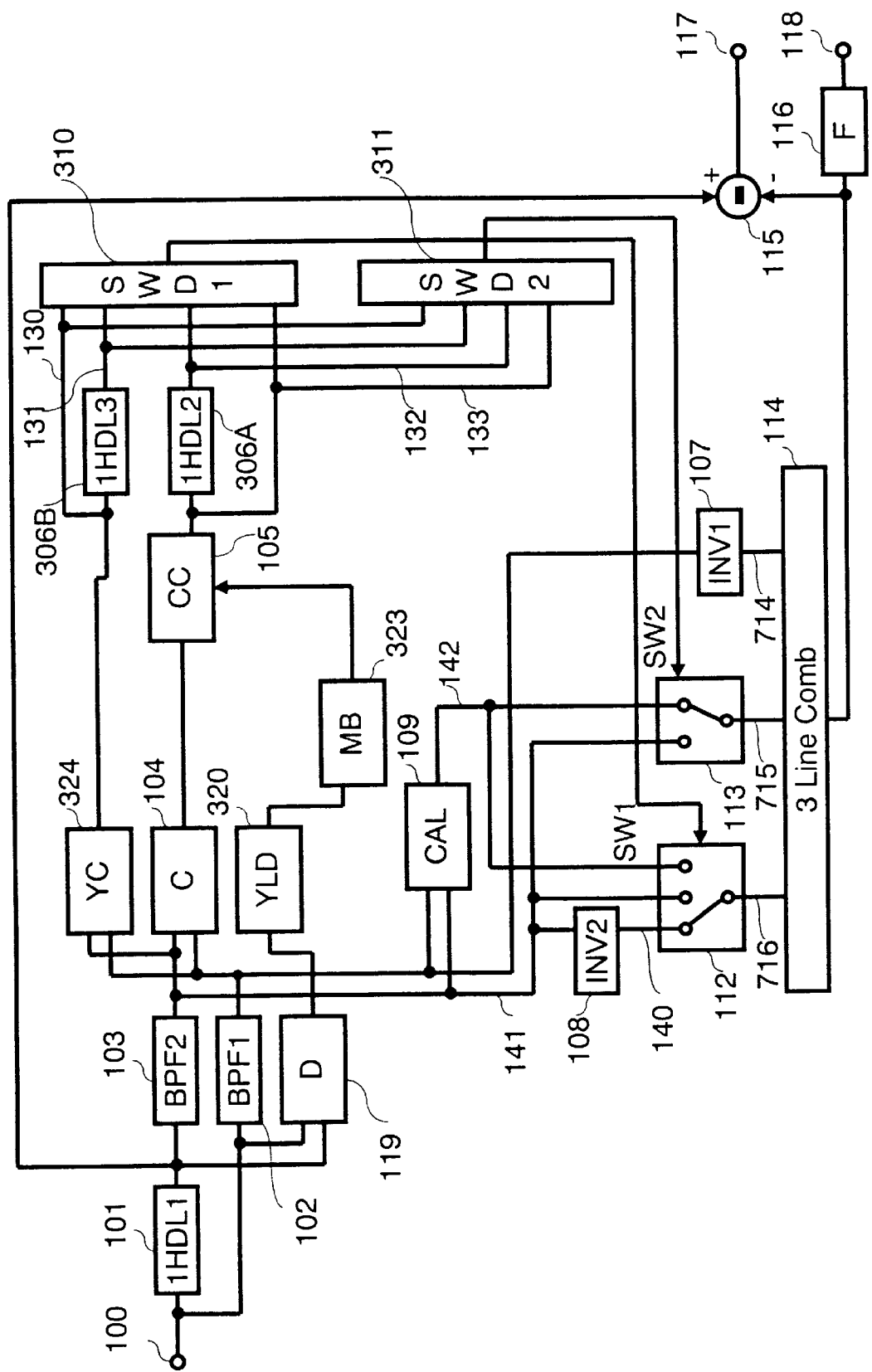
FIG. 6 is a block diagram of a 2-line YC separation device in accordance with a third exemplary embodiment of the present invention.

A third exemplary embodiment of the present invention is explained with reference to FIG. 6. Blocks which have the same functions as the first exemplary embodiment shown in FIG. 1 are given the same numerals, and thus their explanation is not repeated.

A third delay circuit 306B receives the output signal of a YH-correlation detector 324, and delays it for one horizontal scanning period. A first switch determining circuit 310 receives the output signals of a YH-correlation detector 324, a second delay circuit 306A, the third delay circuit 306B, and the C-correlation detector 105, and produces a control signal for switching the first switch circuit 112. A second switch determining circuit 311 receives the output signals of the YH-correlation detector 324, second delay circuit 306A, third delay circuit 306B, and C-correlation detector 105, and produces a control signal for switching the second switch circuit 113. The output signal of a YL difference detector 320 is input to a YL correlation detector 321 and a multiburst detector 323. The multiburst detector 323 inputs the output signal of a YL difference detector 320 and the output signal of the YL correlation detector 321. When the YL correlation detector 321 output the value "1", the multiburst detector 323 passes the output signal of a YL difference detector 320 to the C-correlation detector 105. The remaining configuration is the same as the first exemplary embodiment.

The operation of a 2-line YC separation device configured as above is outlined next. The first band-pass filter 102 and the second band-pass filter 103 are filters which pass signals in the frequency band of the chrominance signal. The C signal detector 104 detects a chrominance signal voltage from the output signals of the first band-pass filter 102 and the second band-pass filter 103. The C-correlation detector 105 refers to the chrominance signal voltage detected by the C signal detector 104 and the output of the multiburst detector 323, and outputs the value "1" if there is line correlation and outputs the value "0" in other cases based on a value detected by the C signal detector 104.

For the DC component, the difference detector 119 subtracts the output signal of the first delay circuit 101 from the composite video signal 100, and the YL difference detector 320 detects a YL signal voltage. The multiburst detector 323 is activated responsive to the output signal of the YL difference detector 320, and the output signal of the YL difference detector 320 is added to the C-correlation detector 105 to intensify the chrominance correlation.

The YH-correlation detector 324 detects the Y signal in the output signals of the first band-pass filter 102 and the second band-pass filter 103, and determines a signal to be correlated when the Y signal is input. In other cases, the Y-correlation detector 324 determines a signal to be not correlated.

The switch determining circuits 310 and 311 receive the output signals of the C-correlation detector 105, YH-correlation detector 324, third delay circuit 306B, and second delay circuit 306A, and produce a switching control signal in accordance with the logic as shown in FIGS. 2A and 2B to switch the output signal of the first switch circuit 112 and second switch circuit 113, respectively.

Accordingly, the third exemplary embodiment produces waveforms as shown in FIGS. 4A to 4P, as in the first exemplary embodiment, and therefore is capable of separating the YC signals as in the first exemplary embodiment.

Fourth Exemplary Embodiment

Figure 7:
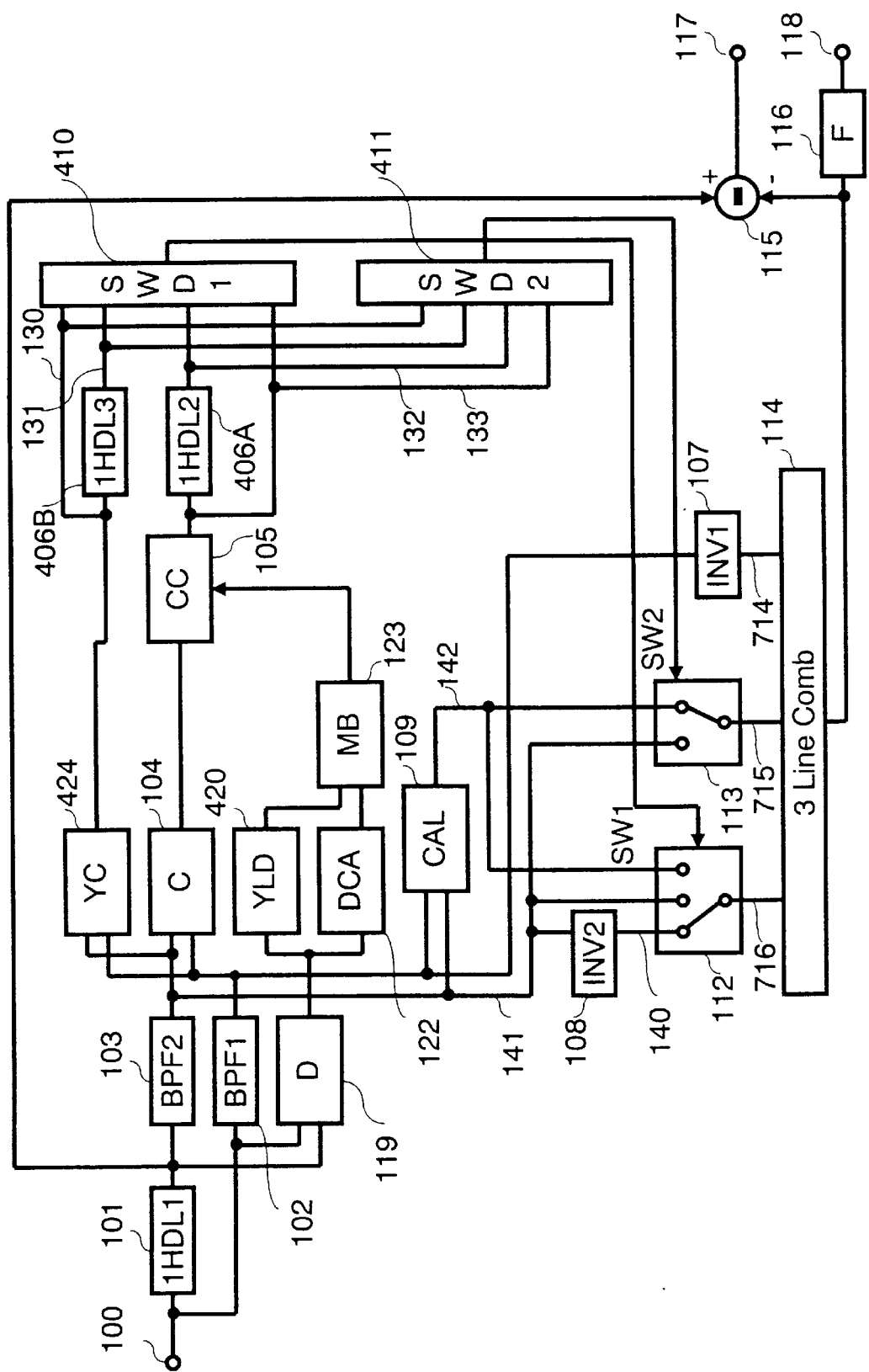
FIG. 7 is a block diagram of a 2-line YC separation device in accordance with a fourth exemplary embodiment of the present invention.

A fourth exemplary embodiment of the present invention is explained with reference to FIG. 7. Blocks which have the same functions as the first exemplary embodiment shown in FIG. 1 are given the same numerals, and thus their explanation is not repeated.

A YL difference detector 420 detects the amplitude of the output signal of the difference detector 119 after removing the frequency component of the chrominance signal, and outputs it to the multiburst detector 123. A YH-correlation detector 424 receives output signals from the first band-pass filter 102 and the second band-pass filter 103, and outputs a signal to a delay circuit 406B. The remaining configuration is the same as in the first exemplary embodiment.

The operation of a 2-line YC separation device configured as above is outlined next. The first band-pass filter 102 and the second band-pass filter 103 are filters which pass signals in the frequency band of the chrominance signal. The C signal detector 104 detects a chrominance signal voltage from the output signals of the first band-pass filter 102 and the second band-pass filter 103. The C-correlation detector 105 refers to a chrominance signal voltage detected by the C signal detector 104 and the output of the multiburst detector 123, and determines a signal to be line correlated when a chrominance signal is input and a signal not to be line correlated in other cases.

For the Y component, the difference detector 119 subtracts the output signal of the first delay circuit 101 from the composite video signal 100, and detects a difference signal voltage. The difference adaptive circuit 122 receives the output signal of the difference detector 119, and detects a correlation before the signal passes through the first band-pass filter 102 and the second band-pass filter 103. The multiburst detector 123 is turned on when the difference adaptive circuit 122 determines the signal to be correlated, and the output signal of the YL difference detector 420 is added to the C-correlation detector 105 to intensify the chrominance correlation.

The YH-correlation detector 424 detects the Y signal in the output signals of the first band-pass filter 102 and the second band-pass filter 103, determines a signal to be correlated when the Y signal is input, and determines a signal to be not correlated in other cases.

Switch determining circuits 410 and 411 receive the output signals of the C-correlation detector 105, YH-correlation detector 424, third delay circuit 406B, and second delay circuit 406A, and produce a switching control signal in accordance with the logic as shown in FIGS. 2A and 2B to switch the output signal of the first switch circuit 112 and the second switch circuit 113, respectively.

Accordingly, the fourth exemplary embodiment produces waveforms as shown in FIGS. 4A to 4P, as in the first exemplary embodiment, and therefore is capable of separating the YC signals as in the first exemplary embodiment.

Fifth Exemplary Embodiment

Figure 8:
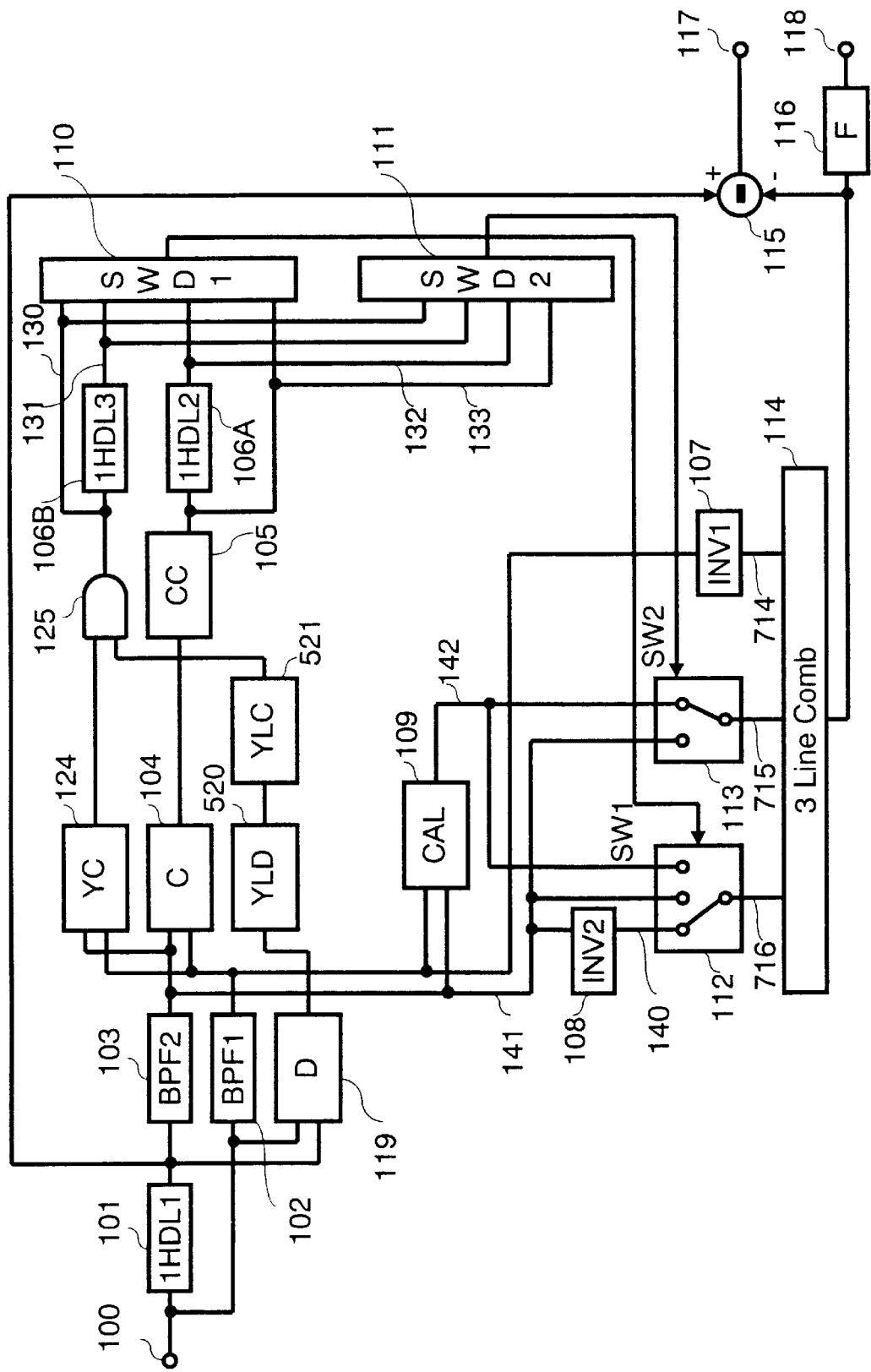
FIG. 8 is a block diagram of a 2-line YC separation device in accordance with a fifth exemplary embodiment of the present invention.

A fifth exemplary embodiment of the present invention is explained with reference to FIG. 8. Blocks which have the same finctions as the first exemplary embodiment shown in FIG. 1 are given the same numerals, and thus their explanation is not repeated.

A YL difference detector 520 detects an amplitude of the output signal of the difference detector 119 after removing signal components in the frequency band of the chrominance signal, and outputs it to the YL-correlation detector 521. The remaining configuration is the same as in the first exemplary embodiment.

The operation of a 2-line YC separation device configured as above is outlined next. The first band-pass filter 102 and the second band-pass filter 103 are filters which pass signals in the frequency band of the chrominance signal. The C signal detector 104 detects a chrominance signal voltage from the output signals of the first band-pass filter 102 and the second band-pass filter 103. The C-correlation detector 105 refers to a chrominance signal voltage detected by the C signal detector 104, and determines a signal to be correlated when a chrominance signal is input and a signal to be not correlated in other cases.

For the Y component, the difference detector 119 subtracts the output signal of the first delay circuit 101 from the composite video signal 100, and the YL difference detector 520 detects a difference signal voltage.

The YH-correlation detector 124 detects a Y signal in the output signals of the first band-pass filter 102 and the second band-pass filter 103. When the YH signal is input, the YH-correlation detector 124 determines that there is line correlation, and in other cases, the YH-correlation detector 124 determines that there is no line correlation. The YL-correlation detector 521 determines line correlation from the output of the YL difference detector 520. In other cases, the YL-correlation detector 521 determines that there is no correlation. The Y correlation is determined by conducting the logical AND operation on the output signals of the YL-correlation detector 521 and the YH-correlation detector 124 by the AND circuit 125.

The first switch determining circuit 10 and the second switch determining circuit 111 receive the output signals of the C-correlation detector 105, AND circuit 125, third delay circuit 106B, and second delay circuit 106A, and produce a switching control signal in accordance with the logic as shown in FIGS. 2A and 2B to switch the output signal of the first switch circuit 112 and the second switch circuit 113.

Accordingly, the fifth exemplary embodiment produces waveforms as shown in FIGS. 4A to 4P, as in the first exemplary embodiment, and therefore is capable of separating the YC signals as in the first exemplary embodiment.

Sixth Exemplary Embodiment

Figure 9:
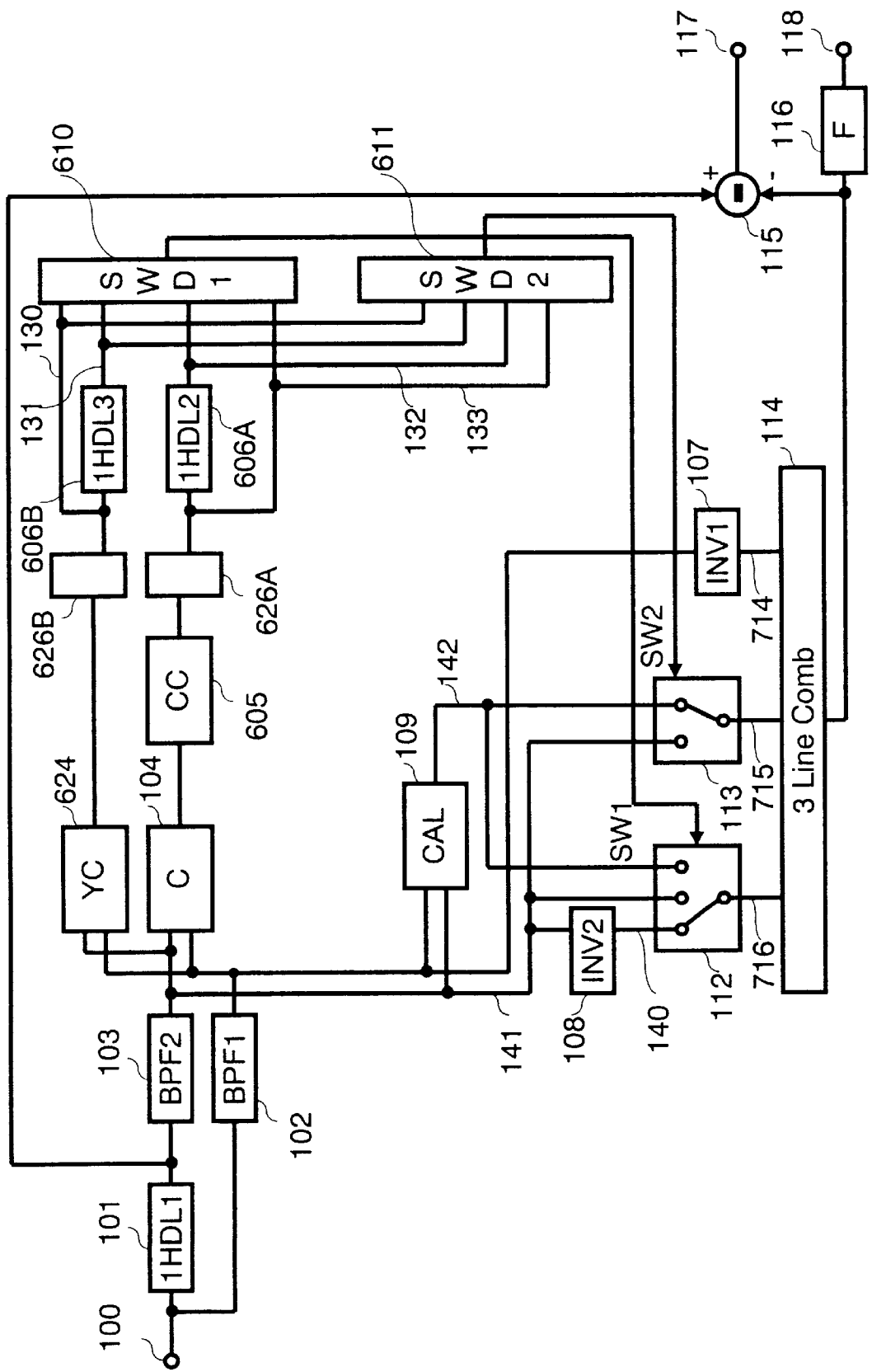
FIG. 9 is a block diagram of a 2-line YC separation device in accordance with a sixth exemplary embodiment of the present invention.

A sixth exemplary embodiment of the present invention is explained with reference to FIG. 9. Blocks which are the same as the first exemplary embodiment shown in FIG. 1 are given the same numerals, and thus their explanation is not repeated.

A C-correlation detector 605 receives the output signal of the C signal detector 104. A first correlation extension circuit 626A and a second correlation extension circuit extend the no-correlation state of the input signal with respect to time. A second delay circuit 606A receives the output signal of the first correlation extension circuit 626A, and delays the input signal for one horizontal scanning period, and a third delay circuit 606B receives the output signal of the second correlation extension circuit 626B, and delays the input signal for one horizontal period. A first switch determining circuit 610 receives the output signals of the second correlation extension circuit 626B, third delay circuit 606B, second delay circuit 606A, and the first correlation extension circuit 626A, and produces a control signal for switching the first switch circuit 112. A second switch determining circuit 611 receives the output signals of the second correlation extension circuit 626B, third delay circuit 606B, second delay circuit 606A, and first correlation extension circuit 626A, and produces a control signal for switching the second switch circuit 113. A YH-correlation detector 624 receives the output signals of the first band-pass filter 102 and second band-pass filter 103.

The operation of a 2-line YC separation device configured as above is outlined next. The first band-pass filter 102 and the second band-pass filter 103 are filters which pass signals in the frequency band of the chrominance signal. The C signal detector 104 detects a chrominance signal voltage from the output signals of the first band-pass filter 102 and the second band-pass filter 103. The C-correlation detector 605 refers to the chrominance signal voltage detected by the C signal detector 104, and determines a signal to be correlated when a chrominance signal is input and a signal not to be correlated in other cases.

The YH-correlation detector 624 is a circuit which detects a Y signal in the output signals from the first band-pass filter 102 and the second band-pass filter 103. When the Y signal is input, the YH-correlation detector 624 determines that there is line correlation, and in other cases, the YH-correlation detector 624 determines that there is no line correlation.

Figure 10A:
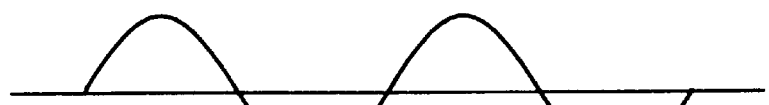
FIGS. 10A to 10E are operation waveforms of a correlation extension circuit in accordance with the sixth exemplary embodiment of the present invention.
Figure 10B:
Figure 10C:
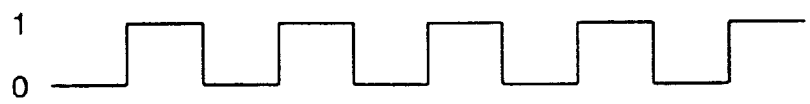
Figure 10D:
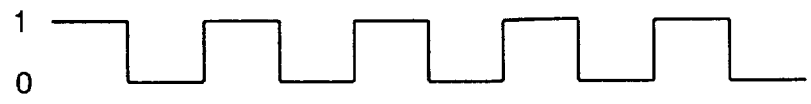
Figure 10E:
Figure 11:
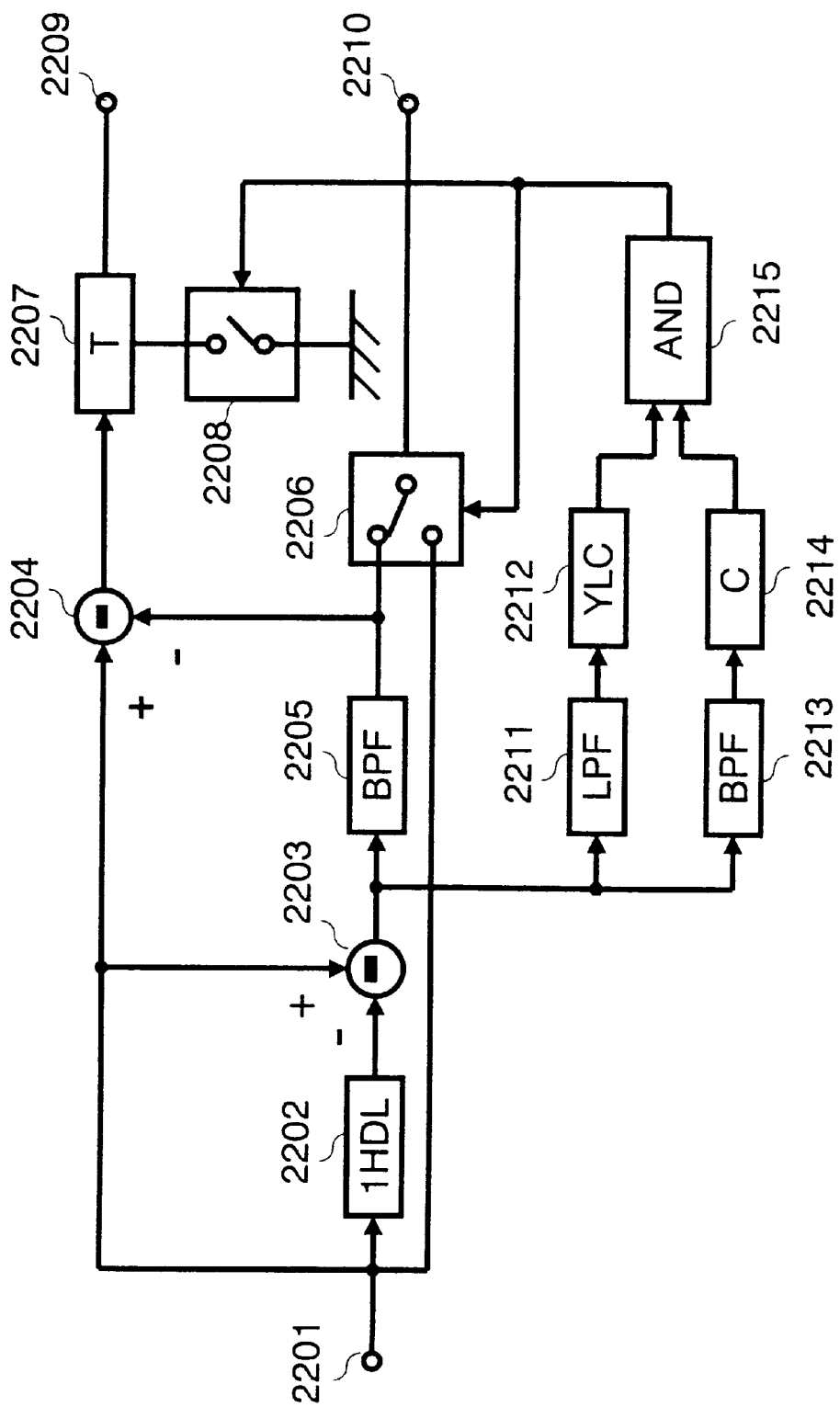
FIG. 11 is a block diagram of a 2-line YC separation device of the prior art.
Figure 12A:
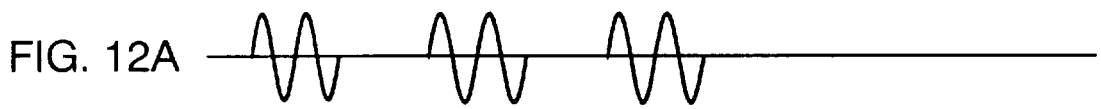
FIGS. 12A to 12J are operation waveforms of a 2-line YC separation device of the prior art.
Figure 12B:
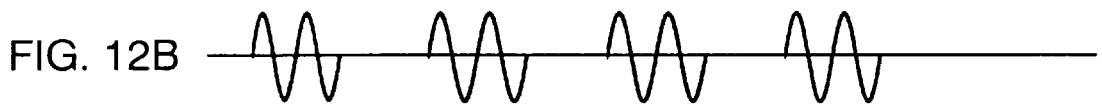
Figure 12C:
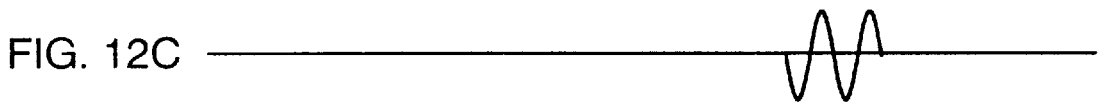
Figure 12D:
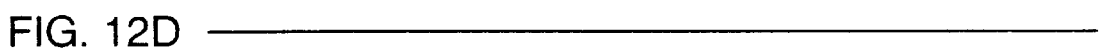
Figure 12E:
Figure 12F:
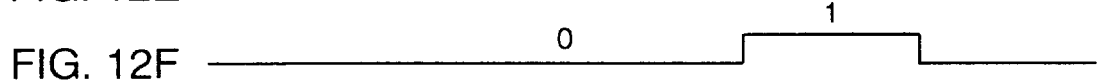
Figure 12G:
Figure 12H:
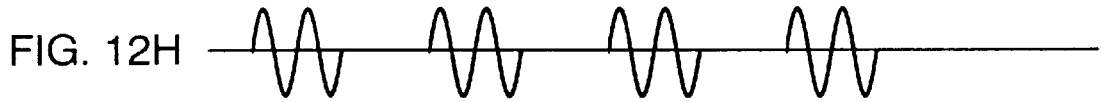
Figure 12I:
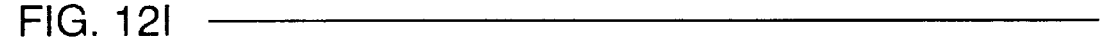
Figure 12J:
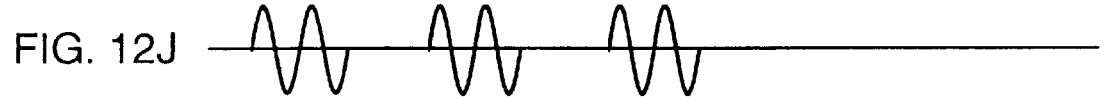

The operation of the first correlation extension circuit 626A and the second correlation extension circuit 626B are explained with reference to FIGS. 10A to 10E. If an input signal, as shown in FIG. 10A, is sampled at the timing as shown in FIG. 10B, namely at a sampling frequency which is an even multiple of the input signal frequency, the output is changed to the values "1" and "0" alternately as shown in FIG. 10C. FIG. 10D shows a signal after extending the signal shown in FIG. 10C with respect to time. FIG. 10E shows the output signal of the logical AND operation of the signals shown in FIGS. 10C and 10D. Consequently, instability of the correlation detection can be prevented.

The first switch determining circuit 610 and second switch determining circuit 611 receive a signal obtained by inputting the output signal of the C-correlation detector 605 to the correlation extension circuit 626A, a signal obtained by inputting the output signal of the Y-correlation detector 624 to the correlation extension circuit 626B, the output signal of the second delay circuit 606A, and the output signal of the third delay circuit 606B, and produce a switching control signal in accordance with the logic as shown in FIGS. 2A and 2B to switch the output signal of the first switch circuit 112 and the second switch circuit 113, respectively.

Accordingly, the sixth exemplary embodiment produces the waveforms shown in FIGS. 4A to 4P, as in the first exemplary embodiment, and therefore is capable of separating the YC signals as in the first exemplary embodiment.

The exemplary embodiments of the present invention relate to an NTSC system but may also be applied to a PAL system. In a PAL system two horizontal scanning period delay circuits are preferably used in FIGS. 1, 5, 6, 7, 8, and 9 in place of the one horizontal scanning period delay circuits.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A 2-line YC separation device for use with a composite input video signal, said device comprising:

a first delay circuit for delaying the composite input video signal;

a first band-pass filter for filtering said composite input video signal;

a second-band pass filter for filtering an output signal of said first delay circuit;

a first correlation detector for detecting a first line correlation between two luminance signals of said composite input video signal delayed from each other;

a second correlation detector for detecting a second line correlation between two chrominance signals of said composite input video signal delayed from each other;

a first inverter for inverting an output signal of said first band-pass filter;

a second inverter for inverting an output signal of said second band-pass filter;

a calculator for generating a mean value of the output signals of said first and second band-pass filters;

a selector which selects and outputs one of i) an output signal of said calculator, ii) an output signal of said first inverter, iii) an output signal of said second inverter, and iv) the output signal of said second band-pass filter, responsive to i) an output signal of said first correlation detector, ii) a delayed output signal of said first correlation detector, iii) an output signal of said second correlation detector, and iv) a delayed output signal of said second correlation detector;

a subtractor for subtracting the output signal of said first delay circuit and an output signal of said logic circuit; and a filter for filtering the output signal of said logic circuit.

2. A 2-line YC separation device for use with a composite input video signal, said device comprising:

a first delay circuit for delaying the composite input video signal;

a first band-pass filter for filtering said composite input video signal;

a second-band pass filter for filtering an output signal of said first delay circuit;

a C signal detector coupled to said first and said second band-pass filters for detecting a voltage of a chrominance signal;

a C-correlation detector coupled to said C signal detector;

a difference detector to detect a Y signal voltage from the difference in said composite input video signal and the output signal of said first delay circuit;

a YL difference detector for detecting an amplitude of an output signal of said difference detector after removing a frequency component in a frequency band of the chrominance signal;

a YL-correlation detector for detecting a line correlation responsive to an output signal of said YL difference detector;

a second delay circuit for delaying an output signal of said C-correlation detector;

a third delay circuit for delaying an output signal of said YL-correlation detector;

a first switch determining circuit coupled to i) said YL-correlation detector, ii) said C-correlation detector, iii) said second delay circuit and iv) said third delay circuit;

a second switch determining circuit coupled to i) said YL-correlation detector, ii) said C-correlation detector, iii) said second delay circuit and, iv) said third delay circuit;

a first inverter for inverting the output signal of said first band-pass filter;

a second inverter for inverting the output signal of said second bandpass filter;

a calculator for generating a mean value based on the output signals of said first and second band-pass filters;

a first switch circuit which selectively outputs one of an output signal of i) said calculator, ii) said second inverter, and iii) said second band-pass filter responsive to an output signal of said first switch determining circuit;

a second switch circuit which selectively outputs one of the output signals of said calculator and said second band-pass filter responsive to an output signal of said second switch determining circuit;

a 3-line-comb operational circuit coupled to said first inverter, said first switch circuit, and said second switch circuit;

a subtractor coupled to said first delay circuit and said 3-line-comb operational circuit; and a filter for filtering an output signal of said 3-line-comb operational circuit.

3. A 2-line YC separation device as defined in claim 2, further comprising:

a Y-correlation detector coupled to said first and second band-pass filters; and an AND circuit to logically combine an output signal of said Y-correlation detector and the output signal of said YL-correlation detector;

wherein said third delay circuit, said first switch determining circuit, and said second switch determining circuit are coupled to an output of said AND circuit.

4. A 2-line YC separation device as defined in claim 3, further comprising:

a difference adaptive circuit coupled to said difference detector to determine the presence of a line correlation; and a multiburst detector coupled to said difference adaptive circuit and said YL difference detector, said multiburst detector selectively passing the output signal of said YL difference detector to said C-correlation detector when an output of said difference adaptive circuit indicates the line correlation.

5. A 2-line YC separation device for use with a composite input video signal, said device comprising:

a first delay circuit for delaying the composite input video signal for at least one horizontal scanning period;

a first band-pass filter which receives said composite input video signal;

a second-band pass filter coupled to said first delay circuit;

a C signal detector coupled to said first and said second band-pass filters, for detecting a voltage of a chrominance signal;

a C-correlation detector coupled to said C signal detector;

a difference detector to detect a Y signal voltage from a difference in said composite input video signal and an output signal of said first delay circuit;

a YL difference detector for detecting an amplitude of an output signal of said difference detector after removing a frequency component in a frequency band of the chrominance signal;

a multiburst detector coupled to said YL difference detector, said multiburst detector selectively passing an output signal of said YL difference detector to said C-correlation detector;

a Y-correlation detector coupled to said first and second band-pass filters;

a second delay circuit for delaying an output signal of said C-correlation detector;

a third delay circuit for delaying an output signal of said Y-correlation detector;

a first switch determining circuit coupled to i) said Y-correlation detector, ii) said C-correlation detector, iii) said second delay circuit and iv) said third delay circuit;

a second switch determining circuit coupled to i) said Y-correlation detector, ii) said C-correlation detector, iii) said second delay circuit and, iv) said third delay circuit;

a first inverter for inverting an output signal of said first band-pass filter;

a second inverter for inverting an output signal of said second band-pass filter;

a calculator for generating a mean value based on the output signals of said first and second band-pass filters;

a first switch circuit which selectively outputs one of the output signals of i) said calculator, ii) said second inverter, and iii) said second band-pass filter responsive to an output signal of said first switch determining circuit;

a second switch circuit which selectively outputs one of the output signals of said calculator and said second band-pass filter responsive to an output signal of said second switch determining circuit;

a 3-line-comb operational circuit coupled to said first inverter, said first switch circuit, and said second switch circuit;

a subtractor coupled to said first delay circuit and said 3-line-comb operational circuit; and a filter for filtering an output signal of said 3-line-comb operational circuit.

6. A 2-line YC separation device as defined in claim 5, further comprising a difference adaptive circuit coupled to said difference detector to i) determine the presence of a line correlation and ii) output the result to said multiburst detector;

said multiburst detector further coupled to said difference adaptive circuit, and selectively passing the output signal of said YL difference detector to said C-correlation detector when the output of said difference adaptive circuit indicates the line correlation.

7. A 2-line YC separation device for use with a composite input video signal, said device comprising:

delay means for delaying the composite input video signal and generating a delayed composite video signal;

filter means for filtering said composite input video signal and said delayed composite video signal;

correlation means for correlating i) a luminance component and ii) a chrominance component of said composite input video signal and said delayed composite video signal;

inverter means for inverting an output of said filter means and generating an inverted filtered video signal;

switching means to selectively couple one of i) the inverted filtered video signal and ii) said filtered video signal to a comb means responsive to an output signal of said correlation means, said comb means producing a combed video signal;

second filter means for filtering said combed video signal to produce a filtered chrominance signal; and subtractor means coupled to said first delay means and said comb means for subtracting said combed video signal from said delayed composite video signal to produce a luminance output signal.

* * * * *

UNITED STATES PATENT AND TRADE MARK OFFICE
CERTIFICATE OF CORRECTION

PATENT NO.    : 5,969,771
DATED         : October 19, 1999
INVENTOR(S)   : Sugimoto et al.

It is certified that error appears in the above-identified patent and that said Letters Patent is hereby corrected as shown below:

On the cover page, item [56] References Cited list the following:

FOREIGN PATENT DOCUMENTS 04150595  5/1992  Japan
01206793  8/1989  Japan
0322890   7/1989  EPO
0590831   4/1994  EPO
2-271907  4/1994  Great Britain
2-283147  4/1995  Great Britain

OTHER DOCUMENTS

European Search Report dated June 29, 1999, application no. 97119035.

Signed and Sealed this

Twenty-eighth Day of November, 2000

Attest:

Q. TODD DICKINSON

Attesting Officer          Director of Patents and Trademarks